(12) United States Patent
Yoshida

(10) Patent No.: US 6,982,806 B2
(45) Date of Patent: Jan. 3, 2006

(54) FACSIMILE APPARATUS, CONTROL METHOD FOR FACSIMILE APPARATUS, AND COMPUTER-READABLE STORAGE MEDIUM STORING CONTROL PROGRAM FOR FACSIMILE APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 10/193,199

(22) Filed: Jul. 12, 2002

(65) Prior Publication Data

US 2002/0171876 A1 Nov. 21, 2002

Related U.S. Application Data

(63) Continuation of application No. PCT/JP01/00067, filed on Oct. 1, 2001.

(30) Foreign Application Priority Data

Jan. 14, 2000 (JP) .............................. 2000-005134

(51) Int. Cl.
*H04N 1/00* (2006.01)
(52) U.S. Cl. .................... 358/1.15; 358/434; 358/435; 358/438
(58) Field of Classification Search ............... 358/1.15, 358/1.13, 1.14, 1.18, 400, 434, 435, 436, 358/438, 468
See application file for complete search history.

(56) References Cited

U.S. PATENT DOCUMENTS

| 4,554,592 A | 11/1985 | Yoshida ...................... 358/257 |
| 5,257,114 A | 10/1993 | Yoshida et al. ............. 358/448 |

(Continued)

FOREIGN PATENT DOCUMENTS

JP   4-117056 A   4/1992

(Continued)

OTHER PUBLICATIONS

ITU-T Kankokushu T Series Kankokushu (1998 Revised Edition), (Japan), Zaidan Houjin Shinnippon ITU Kyoukai, (Sep. 18, 1998), p. 186.
Technical Article, Zaidan Houjin Shinnippon ITU kyoukai, (Sep. 18, 1998).

*Primary Examiner*—Joseph R. Pokrzywa
(74) *Attorney, Agent, or Firm*—Fitzpatrick, Cella, Harper & Scinto

(57) ABSTRACT

It enables to shorten a communication time for both-side transmission in a case where an original document includes such information of the one side as being blank, and further to perform, on a reception side, both-side recording intended by a transmission side even if the order of pages to be transmitted is changed or even if the front and/or back sides of the original document are took out and put in.

When page data including image data of either one of front and back sides of the original document is transmitted and received, a transmitter adds, to the page data to be transmitted, attribute data of at least a page counter (PC) representing the number of pages of the real original document, information (SIDE) representing whether the front side or the back side of the original document, and virtual page number data (VPC) synchronous with transmission order of the page data, and then transmits the page data added with the attribute data, and a receiver side image-records the received page data to both sides of a recording paper, on the basis of the transmitted attribute data of the page counter (PC) representing the number of pages of the real original document and the information (SIDE) representing whether the front side or the back side of the original document.

16 Claims, 10 Drawing Sheets

U.S. PATENT DOCUMENTS

| | | | | |
|---|---|---|---|---|
| 5,282,050 A * | 1/1994 | Ishizuka et al. | | 358/400 |
| 5,408,340 A * | 4/1995 | Edamura | | 358/468 |
| 5,428,458 A * | 6/1995 | Aiba et al. | | 358/434 |
| 5,585,939 A | 12/1996 | Yoshida | | 358/438 |
| 5,619,344 A | 4/1997 | Yoshida et al. | | 358/468 |
| 5,640,250 A | 6/1997 | Yoshida | | 358/468 |
| 5,642,205 A * | 6/1997 | Kassmann | | 358/468 |
| 5,682,248 A | 10/1997 | Yoshida | | 358/404 |
| 5,815,289 A | 9/1998 | Yoshida et al. | | 358/468 |
| 5,940,188 A * | 8/1999 | Kurozasa | | 358/436 |
| 6,141,109 A | 10/2000 | Yoshida | | 358/1.12 |
| 6,233,057 B1 * | 5/2001 | Ota | | 358/1.13 |
| 6,275,308 B1 | 8/2001 | Yoshida | | 358/450 |
| 6,449,063 B1 * | 9/2002 | Yoshida et al. | | 358/400 |
| 6,563,606 B1 * | 5/2003 | Yoshida | | 358/439 |

FOREIGN PATENT DOCUMENTS

| | | |
|---|---|---|
| JP | 06-303408 | 10/1994 |
| JP | 08-065439 | 3/1996 |
| JP | 8-65439 A | 3/1996 |
| JP | 08-149268 | 6/1996 |
| JP | 11-027434 | 1/1999 |
| JP | 11-27434 A | 1/1999 |
| JP | 11-122403 | 4/1999 |
| JP | 2001-238060 A | 8/2001 |
| WO | WO 01/52521 A1 | 7/2001 |

* cited by examiner

FIG. 10

|  | FRONT SIDE | BACK SIDE |  |
|---|---|---|---|
| PC↓ | | | |
| 1 | SIDE A | SIDE B | |
| | V1 : b1(FC1) | V6 : b1(FC1) | |
| 2 | SIDE A | SIDE B | |
| | | V7 : b1(FC1) | PPS-NULL |
| | | SIDE B | PPS-MPS(PPS-EOM) |
| | V2 : b1(FC1) | V7 : b2(FC2) | |
| 3 | SIDE A | SIDE B | |
| | V3 : b1(FC1) | V8 : b1(FC1) | |
| 4 | SIDE A | ✕ | NO AVAILABLE INFORMATION |
| | V4 : b1(FC1) | | |
| 5 | SIDE A | SIDE B | |
| | V5 : b1(FC1) | V9 : b1(FC1) | |

FACSIMILE APPARATUS, CONTROL METHOD FOR FACSIMILE APPARATUS, AND COMPUTER-READABLE STORAGE MEDIUM STORING CONTROL PROGRAM FOR FACSIMILE APPARATUS

This application is a continuation of International Application No. PCT/JP01/00067, filed Oct. 1, 2001, which claims the benefit of Japanese Patent Application No. 005134/2000, filed Jan. 14, 2000.

TECHNICAL FIELD

The present invention relates to a facsimile apparatus which transmits and receives image data to be recorded on both of front and back sides of a recording paper, a control method for the facsimile apparatus, and a computer-readable storage medium which stores a control program for the facsimile apparatus.

BACKGROUND ART

Conventionally, a facsimile apparatus which can read images on both sides of an original document and transmit the obtained images is known. In this kind of facsimile apparatus, a transmitter side designates both-side transmission via an NSS/DCS (Nonstandard Facilities Setup/Digital Command Signal) signal or the like, whereby the both-side transmission is thus designated. Then, when image data of a both-side original document is transmitted, images on the front and back sides of respective pages are sequentially encoded and transmitted in the order of the front side of the first page, the back side of the first page, the front side of the second page, the back side of the second page, the front side of the n-th page, and the back side of the n-th page. In the real transmission, the data on the front side and the data on the back side are transmitted and received according to the same procedure as that for one page in conventional one-side transmission.

According to the above conventional example, the information on both the sides of the transmission original document can be surely transmitted. However, in such a conventional structure as described above, in a case where the both-side original document and a one-side original document (such as the original document of which only the front side includes image data but the back side is blank) are mixedly present, the image data of the one side (the front or back side of the one-side original document) not including any available data must be transmitted as well as the image data on the side including available data, there is a problem that communication expense necessary for such the transmission of the image data on the side not including any available data is wasted.

Although a data amount of the blank side is not so large if compression transmission is adopted, since the information on the front and back sides is transmitted and received according to the procedure same as that of one page in the one-side transmission, there is a problem that a needless communication time is spent by an inter-page procedure.

The substance of the present invention is to solve the above problems, to be able to shorten the communication time for the both-side transmission in a case where the original document includes such the information of the one side as being blank, and further to be able to perform, on a reception side, both-side recording intended by a transmission side even if the order of pages to be transmitted is changed or even if the front and/or back sides of the original document are took out and put in.

DISCLOSURE OF INVENTION

In order to solve the above problems, according to the present invention, in a facsimile apparatus which transmits and receives image data to be recorded respectively on both front and back sides of a recording paper, a control method for the facsimile apparatus, and a computer-readable storage medium which stores a control program for the facsimile apparatus, there is adapted the structure that, when the facsimile apparatus transmits and receives page data including the image data of either one of front and back sides of an original document, a transmitter adds, to the page data to be transmitted, attribute data of at least a page counter (PC) representing the number of pages of the real original document, information (SIDE) representing whether the front side or the back side of the original document, and virtual page number data (VPC) synchronous with transmission order of the page data, and then transmits the page data added with the attribute data, and a receiver image-records the received page data to both the sides of the recording paper, on the basis of the transmitted attribute data of the page counter (PC) representing the number of pages of the real original document and the information (SIDE) representing whether the front side or the back side of the original document.

Moreover, there is adapted the structure that the attribute data is transmitted and received via a post-message signal according to a recommended facsimile procedure.

Moreover, there is adapted the structure that the page data is transmitted and received with a block as a unit, the block having a predetermined frame structure, and at that time, data (BC) representing a block number corresponding to a virtual page number and frame number data (FC) representing the number of frames constituting each block are included in the attribute data.

Moreover, there is adapted the structure that the receiver side performs an error check concerning the page data by using the attribute data received together with the page data, and, if an error is detected, requests re-transmission to the transmitter.

Moreover, there is adapted the structure that the transmission, the reception and re-transmission of the page data and the attribute data are performed by using an ECM procedure.

According to the above structures, it is possible to add, to the page data to be transmitted, the attribute data of at least the page counter (PC) representing the number of pages of the real original document, the information (SIDE) representing whether the front side or the back side of the original document, and the virtual page number data (VPC) synchronous with the transmission order of the page data, and then transmit and receive thus obtained data. Further, on the receiver side, it is possible to image-record the received page data to both the sides of the recording paper, on the basis of the transmitted attribute data of the page counter (PC) representing the number of pages of the real original document and the information (SIDE) representing whether the front side or the back side of the original document. Therefore, even if the images are transmitted in arbitrary order or even if the page data corresponding to an unnecessary side is omitted from being transmitted, the entire transmission images can be correctly reproduced on the receiver side.

BRIEF DESCRIPTION OF THE DRAWINGS

FIG. 10 is a view showing an example of the image data to which the attribute data to be transmitted and received in the present invention has been added.

BEST MODE FOR CARRYING OUT THE INVENTION

Figure 1:
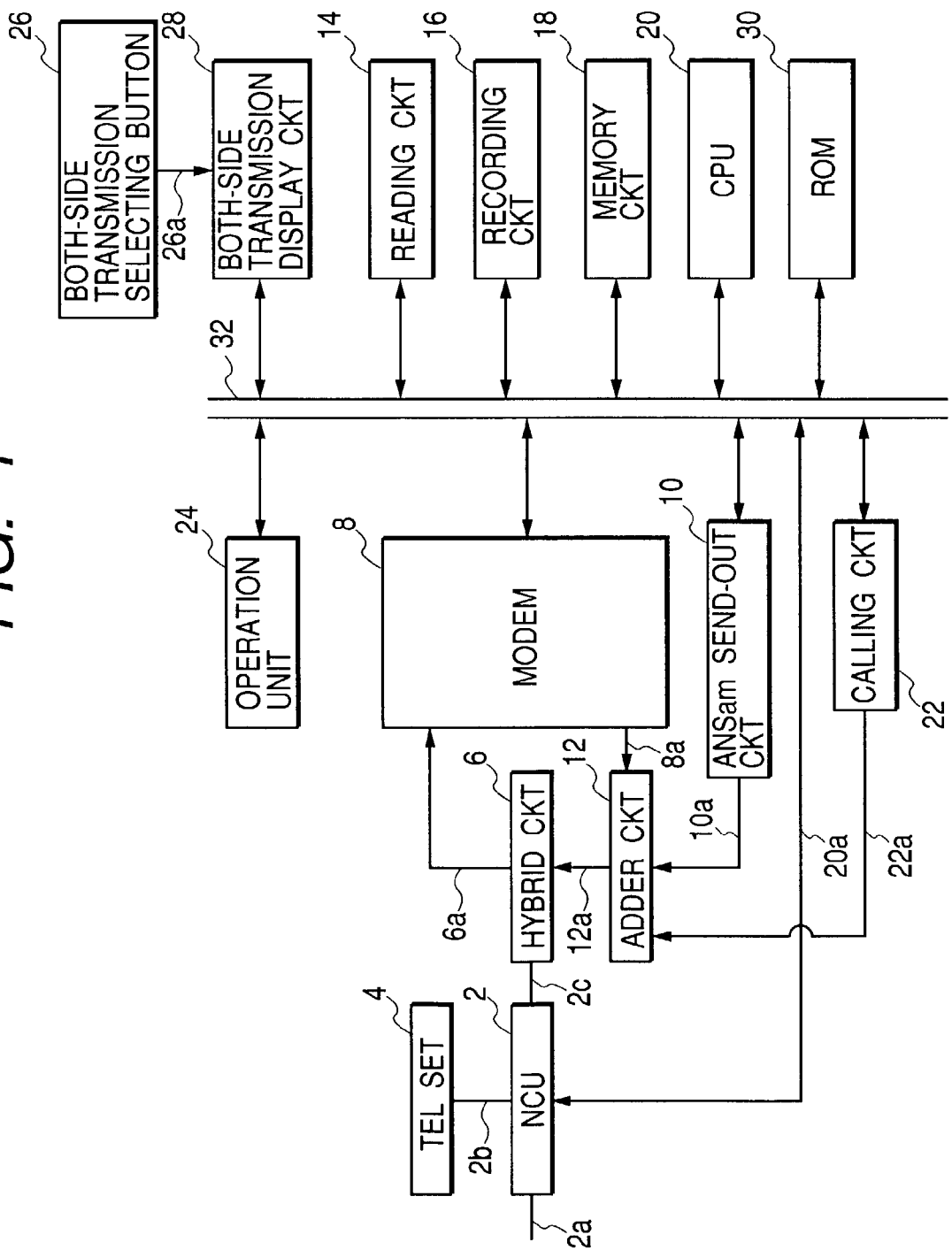
FIG. 1 is a block diagram showing the structure of a facsimile apparatus to which the present invention is adopted.

Hereinafter, the embodiment of the present invention will be explained with reference to the attached drawings. FIG. 1 shows the hardware structure of a facsimile apparatus to which the present invention is adopted.

In FIG. 1, numeral 2 denotes an NCU (network control unit) which connects a telephone network to a terminal of a data communication line to use it in data communication or the like, performs connection control of a telephone exchange network, performs switching to a data communication path, and maintains a loop. Moreover, based on control from a bus 32, the NCU 2 connects a telephone line 2a to the side of the telephone set (CML off) or connects the telephone line 2a to the side of the facsimile apparatus (CML on). Incidentally, in a normal state, the telephone line 2a is being connected to the side of a telephone set 4.

Numeral 6 denotes a hybrid circuit which separates a transmission-system signal from a reception-system signal, sends out a transmission signal from an adder circuit 12 to the telephone line 2a through the NCU 2, receives a signal from a partner side through the NCU 2, and sends out the received signal to a modem 8 through a signal line 6a.

Numeral 8 denotes the modem which performs modulation and demodulation according to ITU-T Recommendations V.8, V.21, V.27ter, V.29, V.17 and V.34, and each transmission mode is designated based on the control from the bus 32. A transmission signal from the bus 32 is input to the modem 8, modulation data is output from the modem 8 to a signal line 8a, a reception signal output to the signal line 6a is input to the modem 8, and demodulation data is output from the modem 8 to the bus 32.

Numeral 10 denotes a circuit which sends out an ANSam signal. The circuit 10 determines whether or not to send out the ANSam signal in response to a signal from the bus 32.

Numeral 12 denotes the adder circuit to which the information on the signal line 8a, information on a signal line 10a and information on a signal line 22a are input, and from which the added result is output to a signal line 12a.

Numerals 14 and 16 indicate an image reading system and an image recording system, respectively. To cope with both-side transmission, the image reading and recording system can read both of front and back sides of an original document and can perform recording on both of front and back sides of a recording paper.

First, numeral 14 denotes a reading circuit which is composed of an original document conveying system, an optical reading element, and the like. The reading circuit 14 can read the front side and the back side of the original document based on control from the bus 32, and outputs the read data to the bus 32.

Numeral 16 denotes a recording circuit which is to record the image data according to various recording systems such as an electrophotographic system, an ink-jet system and the like, and which sequentially records for each line the information being output to the bus 32. The recording circuit 16 executes the recording on the front side and the back side on the basis of control from the bus 32. In the description, the term "recording paper" is used throughout as the term indicating a medium to which the recording by the recording circuit 16 is performed. However, the material of the "recording paper" need not necessarily be literal "paper", that is, it is needless to say that other materials such as a plastic sheet and the like can be of course used.

Numeral 18 denotes a memory circuit which consists of an arbitrary storage device such as a ROM, a RAM, a hard disk or the like, and which is used to store various data. For example, the memory circuit 18 is used as a working memory, and to store raw information of the read data, encoded information, received information, decoded information or the like.

Numeral 20 denotes a CPU (central processing unit) which is composed of a microprocessor and the like, and is to perform a control process for the entire facsimile apparatus and a facsimile transmission control process. Here, control programs for these processes are stored in a ROM (read-only memory) 30.

Numeral 22 denotes a calling circuit to which telephone number information is input through the bus 32, and from which a selection signal of DTMF (Dual Tone Multi Frequency) format is output to the signal line 22a.

Numeral 24 denotes an operation unit which is composed of a display, a keyboard and the like. One-touch dials, abbreviation dials, numerical keys, an "*" key, a "#" key, a start key, a set key, a stop key and other function keys are disposed in the keyboard portion, and key information representing the depressed key is output to the bus 32.

Numeral 26 denotes a both-side transmission selecting button. A user depresses the both-side transmission selecting button 26 when selecting the both-side transmission. If the both-side transmission selecting button 26 is depressed, a depression pulse is generated on a signal line 26a.

Numeral 28 denotes a both-side transmission display circuit which is in a display state of "both-side transmission display is not performed" when a clear pulse is generated on the bus 32, and thereafter repeats display states of "both-side transmission display is performed", "both-side transmission display is not performed" and "both-side transmission display is performed" every time the depression pulse is generated on the signal line 26a by the depression of the both-side transmission selecting button 26. Furthermore, the both-side transmission display circuit 28 outputs to the bus 32 information representing whether or not the both-side transmission display is being performed, and this information is used as the information representing whether or not the apparatus is in a both-side transmission mode in accordance with the operation of the both-side transmission selecting button 26.

Numeral 30 denotes the ROM in which the control programs for the CPU 20 are stored. In the present embodiment, the ROM 30 corresponds to the storage medium of the present invention. The CPU 20 controls peripheral input and output devices in accordance with the control programs stored in the ROM 30, and further performs following control.

In a case where the facsimile apparatus in question acts as a transmitter, if it is selected by the both-side transmission selecting button 26 to transmit the both-side original document, the front side and then the back side of the original document are read in the order of page by the reading circuit 14, and the image data of the front side and the back side are transmitted in the order of page without transmitting back-side information of one-side information.

Here, a post-message signal in case of transmitting each image signal includes information representing the number of pages of the real original document, information representing the front side or the back side of the original document, information representing a virtual page number in the transmission of this time, information representing a block number corresponding to the virtual page number in the transmission of this time, and information representing the number of frames.

Then, a receiver side checks page omission on the basis of the virtual page number and the block number corresponding to the virtual page number, records the image on the front side of the original document to the front side of the recording paper, and records the image on the back side of the original document to the back side of the recording paper. Besides, the receiver side does not perform the recording of the side not received.

Thus, even if any image on the back side of the one-side original document is not transmitted from the transmitter, the receiver side can judge that the image data could be correctly received, whereby conventional uselessness that an inter-page procedure is executed for a blank page can be omitted.

Figure 9:
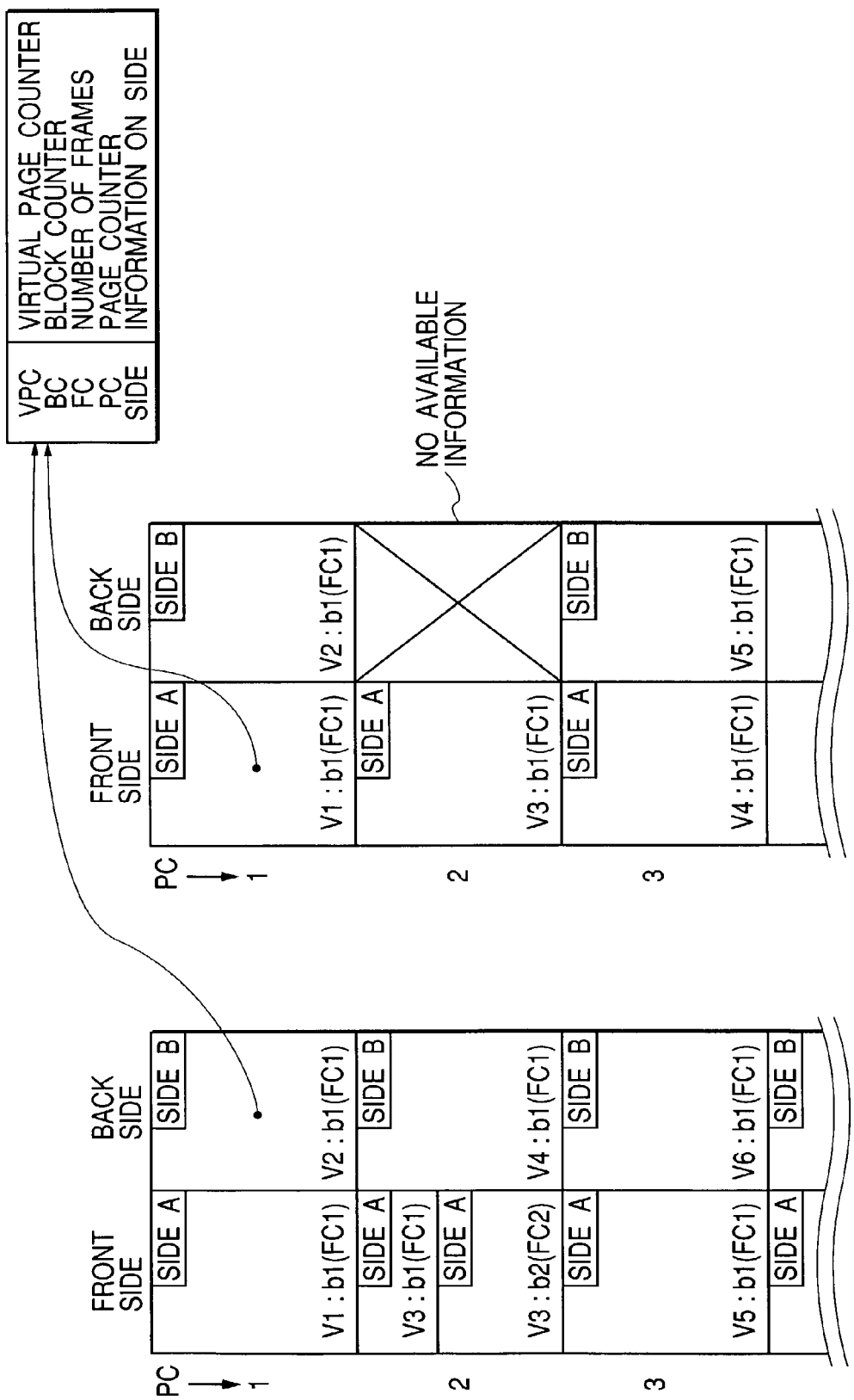
FIG. 9 is a view showing an example of image data to which attribute data to be transmitted and received in the present invention has been added.

FIG. 9 shows a more concrete transmission method. The method as shown in FIG. 9 is used to be able to correctly reproduce the image of the original document on the receiver side even if the image on one of the front and back sides is omitted from being transmitted (e.g., in the case where the one side is entirely blank) or even if the images on all the sides of the original document are transmitted at random (i.e., in both-side page at-random transmission).

In FIG. 9, reference symbol PC denotes an (real) page counter of which the value is incremented like 1, 2, 3, . . . , as the original document sheet advances one by one. On one hand, the images on the front and back sides of the original document are counted by a virtual page counter (later-described VPC) and discriminated by transmitting and receiving the counted values. Here, reference symbols V1 and V2 in FIG. 9 indicate the values counted by the virtual page counter VPC.

The images (virtual pages) on the front and back sides discriminated based on the counted values of the virtual page counter are transmitted with a block as a unit. Here, it is assumed that the transmission data of 256 bytes are set as one frame, and one block can maximumly have the size of 256 frames (64 KB). When the one block is transmitted, attribute data described as below is given and then the obtained block is transmitted by the transmitter.

To simplify the explanation, FIG. 9 shows a case where the image data of one of the front and back sides can be stored within the one block, except for the image data of the second front side at the left of the drawing. Here, reference symbols b1 and b2 in FIG. 9 indicate the block numbers. As shown by the second front side at the left of the drawing, if the image data of the one front (or back) side exceeds the one-block size, a block counter (BC) is incremented, and the excess image data is transmitted as another block.

Moreover, when the one block is transmitted, the number of frames constituting this block is transmitted together. Here, reference symbols FC1 and FC2 in FIG. 9 indicate the numbers of frames.

Moreover, side information (SIDE: the front side is indicated by A and the back side is indicated by B in FIG. 9) representing to which data of the front and back sides the one block (or the several blocks) of the image data on the one side corresponds is generated, and the side information generated for each block is transmitted together with the block in question.

The upper right of FIG. 9 shows an example of the attribute data to be transmitted together with the block data in the transmission of each block. Although a signal format for transmitting the attribute data can be arbitrarily set, it is assumed in the present embodiment that the post-message signal (PPS-Q signal in ECM transmission) is used.

The left of FIG. 9 shows a case where all of the front and back sides of the pages 1, 2 and 3 respectively include available images, while the right of FIG. 9 shows a case where the back side of the page 2 does not include any available data (e.g., entire blank). Even in the latter case, in the conventional procedure, the inter-page procedure is executed, and entire blank information is transmitted. This is because, in the past, such the procedure merely informs the receiver side that the both-side transmission is to be performed, the images on the front and back sides are transmitted in due order according to quite the same method as that in the conventional one-side transmission, and the receiver side merely records the received images sequentially on the front and back sides of the recording paper in due order. Therefore, even in such a case where the one side of the original document is entirely blank, it is necessary to transmit the image on this blank side. However, in the present embodiment, since the attribute data as shown in FIG. 9 is used, even if any procedure is not at all executed for the side not including any available data and real data is not at all transmitted, the receiver side can reproduce the images of the original document on both the front and back sides of the recording paper.

Of course, if the certain side is blank as shown in the right of FIG. 9, in such a structure as above, all the image data can be transmitted in arbitrary order by together transmitting the above attribute data (called the both-side page at-random transmission). For example, although the values of the page counter PC and the virtual page counter VPC in the left of FIG. 9 are arranged in the order of page and in the order of front side and back side, the order of the values of the virtual page counter VPC may be changed as shown in FIG. 10.

The image data are transmitted in the order of virtual page number (block) as later described. However, in case of FIG. 10, all the front sides of real pages are transmitted, and thereafter all the back sides of the real pages are transmitted. On the receiver side, it is possible to reproduce the transmitted images in the correct order by using the values of the page counter PC and the side information SIDE together transmitted.

Next, an operation of the above structure will be explained with reference to FIGS. 2 to 8. Here, FIGS. 2 to 8 show a communication control procedure to be executed by the CPU 20, and it is assumed that in FIGS. 2 to 8 the points indicated by the same circled number are mutually consecutive at the respective positions.

Figure 2:
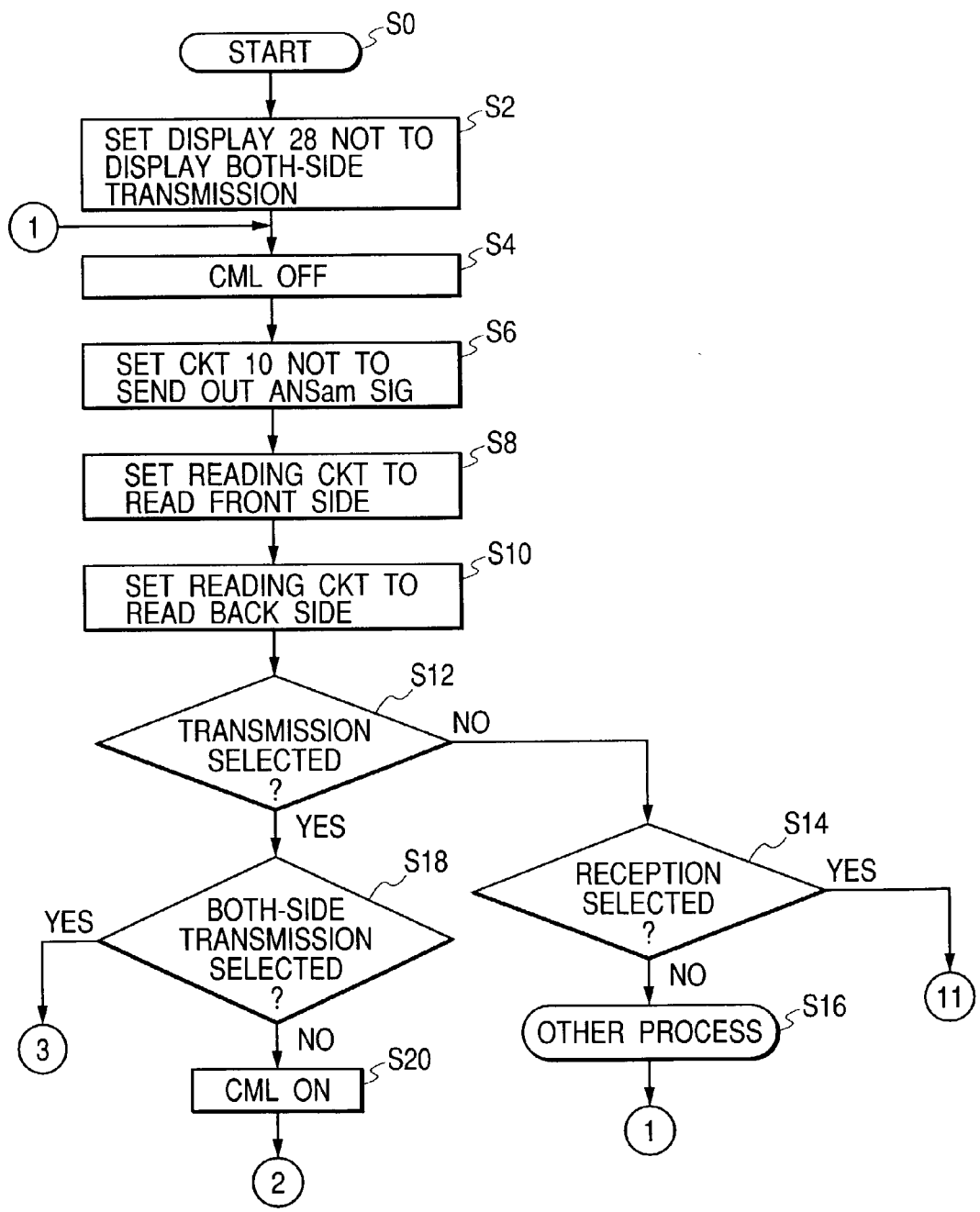
FIG. 2 is a flow chart showing communication control of a CPU 20 shown in FIG. 1.
Figure 3:
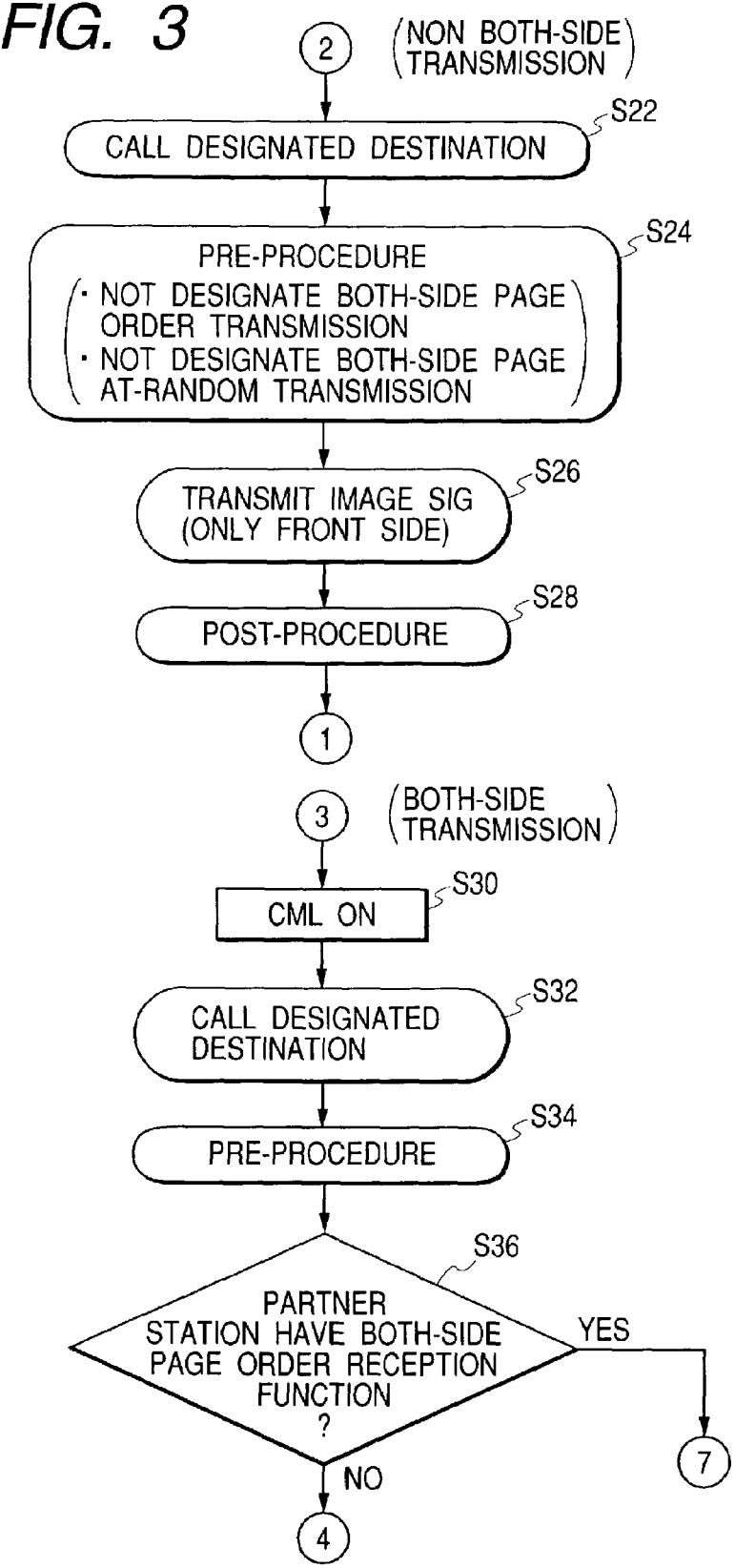
FIG. 3 is a flow chart showing the communication control of the CPU 20 shown in FIG. 1.
Figure 4:
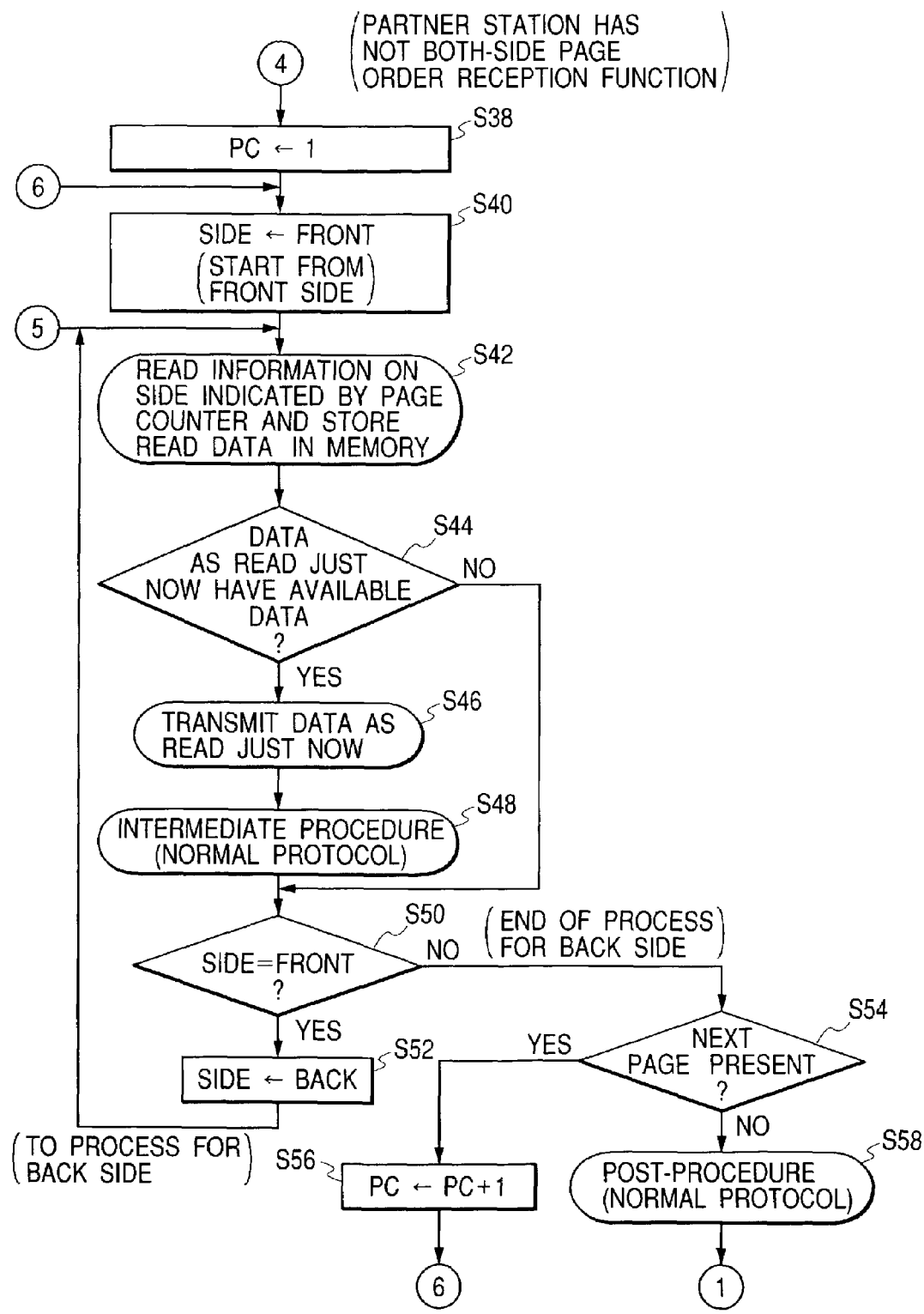
FIG. 4 is a flow chart showing the communication control of the CPU 20 shown in FIG. 1.

In FIG. 2, the process is first started by a predetermined reset operation or the like.

In a step S2, the both-side transmission display circuit 28 is set to be in a non-display state through the bus 32 (non-both-side transmission mode).

In a step S4, the CML of the NCU 2 is turned off through the bus 32, whereby the line 2a is connected to the side of the telephone set 4.

In a step S6, through the bus 32, the ANSam signal send-out circuit 10 is controlled not to send out the ANSam signal.

In a step S8, through the bus 32, the reading circuit 14 is set to read the front side of the original document.

In a step S10, through the bus 32, the reading circuit 14 is set to read the back side of the original document.

In steps S12 and S14, it is judged whether either the transmission or the reception is selected. If the transmission is selected by user's handling of the operation unit 24 or the like, the process advances to a step S18, while if the reception is selected by reception of a calling signal or the like, the process advances to a step S88. On one hand, if neither the transmission nor the reception is selected, the process advances to a step S16 to perform other processes (original document copying and the like).

In the step S18, the information of the both-side transmission display circuit 28 is input through the bus 32, and it is judged by user's handling of the both-side transmission selecting button 26 whether or not the both-side transmission is selected. If the both-side selection is selected, the process advances to a step S30, while if the both-side selection is not selected, the process advances to a step S20.

In the step S20, the CML of the NCU 2 is turned on through the bus 32, whereby the line 2a is connected to the side of the facsimile apparatus.

In a step S22 (FIG. 3), calling (or dialing) is performed to the designated destination by using the calling circuit 22.

In a step S24, a facsimile communication pre-procedure is executed. In the pre-procedure, both-side page order transmission (i.e., the process of transmitting the images of the front and back sides in the order of page) is not designated for the receiver, and also the both-side page at-random transmission (i.e., the process of performing the both-side transmission without transmitting the images of the front and back sides in the order of page) is not designated.

In a step S26, the image signal is transmitted. In this case, only the image of the front side is transmitted. Then, in a step S28, a facsimile communication post-procedure is performed, and the process returns to the step S4.

On one hand, if the both-side transmission is designated, in the step S30, the CML of the NCU 2 is turned on through the bus 32, whereby the line is connected to the side of the facsimile apparatus.

In a step S32, calling is performed to the designated destination by using the calling circuit 22.

In a step S34, the facsimile communication pre-procedure is executed. Then, in a step S36, it is judged whether or not the receiver has a both-side page order reception function. If the receiver has the both-side page order reception function, the process advances to a step S60, while if the receiver does not have the both-side page order reception function, the process advances to a step S38.

If the receiver does not have the both-side page order reception function, in the step S38, "1" is set to the page counter which counts the number of pages of the original document on the transmitter side.

In a step S40, "front side" is set to the information, i.e., the side information or the information on side, which represents the side of the original document to be transmitted. Such the side information is stored in a register area or the like on a not-shown memory.

In a step S42, the image data on the side indicated by the page counter is read, and the read data is stored in the image memory area of the memory circuit 18.

In a step S44, it is judged whether or not the image data as read just now has available data. If the image data has the available data, the process advances to a step S46, while if the image data does not have the available data, the process advances to a step S50. Here, it is possible to judge whether or not the image data of the certain side has the available data, on the basis of a ratio where entire blank lines or white dots are included in the entire image data, or the like.

In the step S46, the image data read in the step S42 is transmitted.

In a step S48, an intermediate procedure is executed. In the intermediate procedure, a protocol according to conventional ITU-T Recommendation T.30 is executed.

In the step S50, it is judged based on the side information set in the step S42 whether or not the side of the original document being processed is the front side. If the side of the original document being processed is the front side, the process advances to a step S52 to set "back side" to the side information, and then the process returns to the step S42 to repeat the above processes to the "back side". On the other hand, in the step S50, if the side information set in the step S42 represents "back side", the process advances to a step S54.

In the step S54, it is judged whether or not a next page is present. If the next page is present, the process advances to a step S56 to increment the value of the page counter by one, while if the next page is not present, the process advances to a step S58.

In the step S58, the facsimile communication post-procedure is performed. In the post-procedure, a protocol according to conventional ITU-T Recommendation T.30 is executed, and then the process returns to the step S4.

As described above, in the case where the partner's receiver does not have the both-side page order reception function, the page counter is incremented only when the process of the back side ends.

On the other hand, in the case where the partner's receiver has the both-side page order reception function, the virtual page counter and the (real) page counter are used as the page counter. In these counters, the virtual page counter counts both the front side and the back side as "pages" respectively, and counts up the values both at the timing of the transition from the process of the front side to the process of the back side and at the timing of the transition from the process of the back side to the process of the front side as later described.

The (real) page counter indicates the number of pages (the number of sheets) of the original document on the transmitter side, and is incremented only in case of the transition from the process of the back side to the process of the front side.

Figure 5:
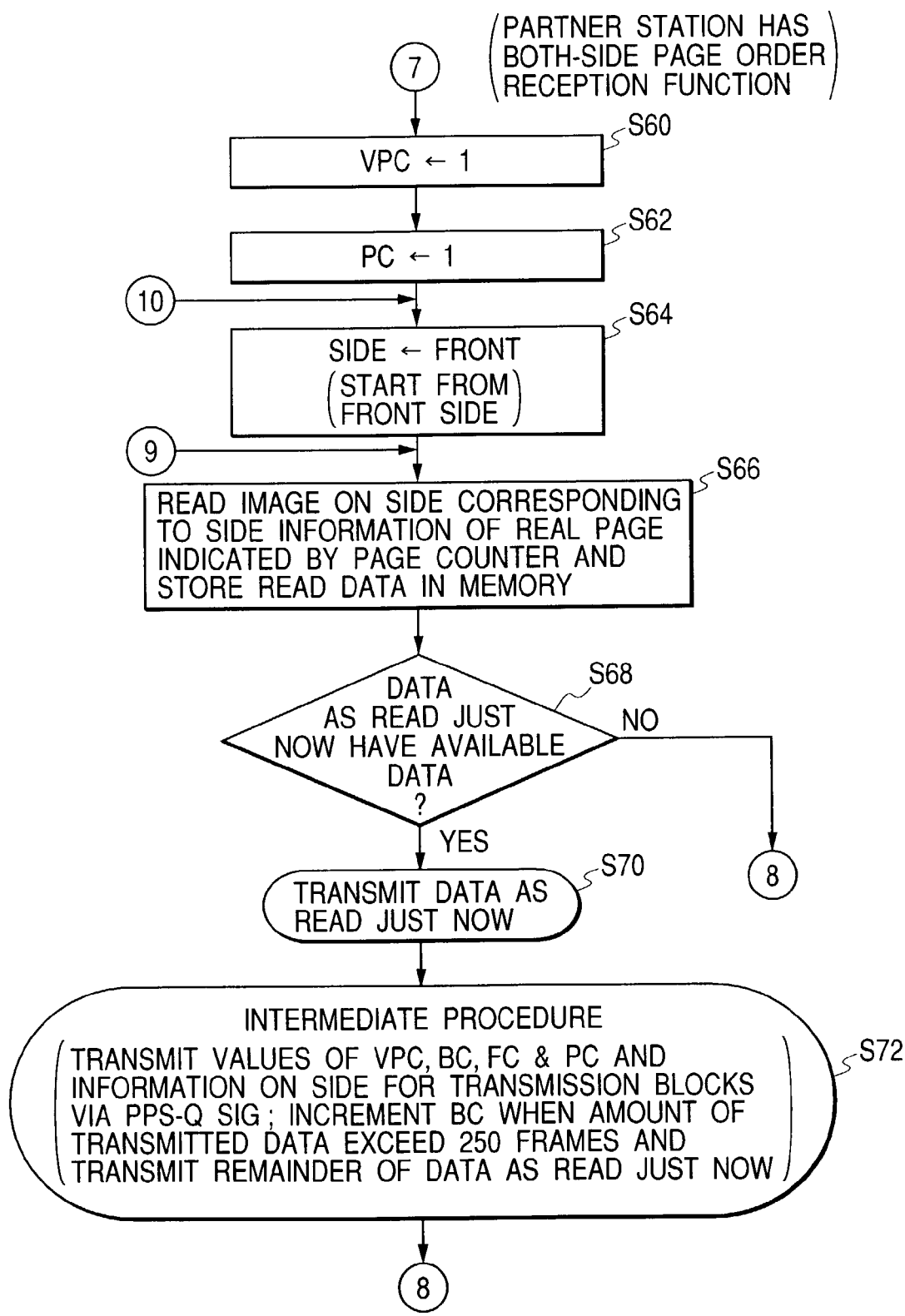
FIG. 5 is a flow chart showing the communication control of the CPU 20 shown in FIG. 1.

In the step S60 of FIG. 5, "1" is first set to the virtual page counter. Further, in a step S62, "1" is set to the (real) page counter which indicates the number of pages of the original document on the transmitter side.

In a step S64, "front side" is set to the side information which represents the side of the original document on the transmitter side.

In a step S66, the image data on the side corresponding to the side information of the original document indicated by the page counter is read and stored in the memory.

In a step S68, it is judged whether or not the data read in the step S66 has available data (by detecting blank lines, white dots and the like described as above). If the data has the available data, the process advances to a step S70, while if the data does not have the available data, the process advances to the step S74.

In the step S70, the data read in the step S66 is transmitted.

In a step S72, the intermediate procedure is executed. In this case, the image data is transmitted by using a handshaking procedure in the ECM communication.

That is, as shown in FIG. 9, in the step S72, the virtual page counter (VPC), the block counter (BC) corresponding to the virtual page counter, the number of frames (FC) of the block, the (real) page counter (PC), the side information or the information on side (SIDE) are included in the PPS-Q signal, and the obtained signal is transmitted. Here, it is assumed that one frame corresponds to 256 bytes of (already encoded) transmission data. If an amount of the transmission data exceeds 256 frames (256×256 bytes: 65 KB), the block counter (BC) is incremented, a PPS-NULL signal is transmitted, and then the remainder of the data is transmitted from the already-read image data. On one hand, if the last block of the one side is transmitted, a PPS-EOM signal is transmitted.

The above process is the same as that in the conventional ECM communication. Although the detailed explanations of the construction, the timing, the sequence and the like of the signal are omitted, the image data is transmitted with a block as a unit by using the handshaking procedure in the ECM communication.

Figure 6:
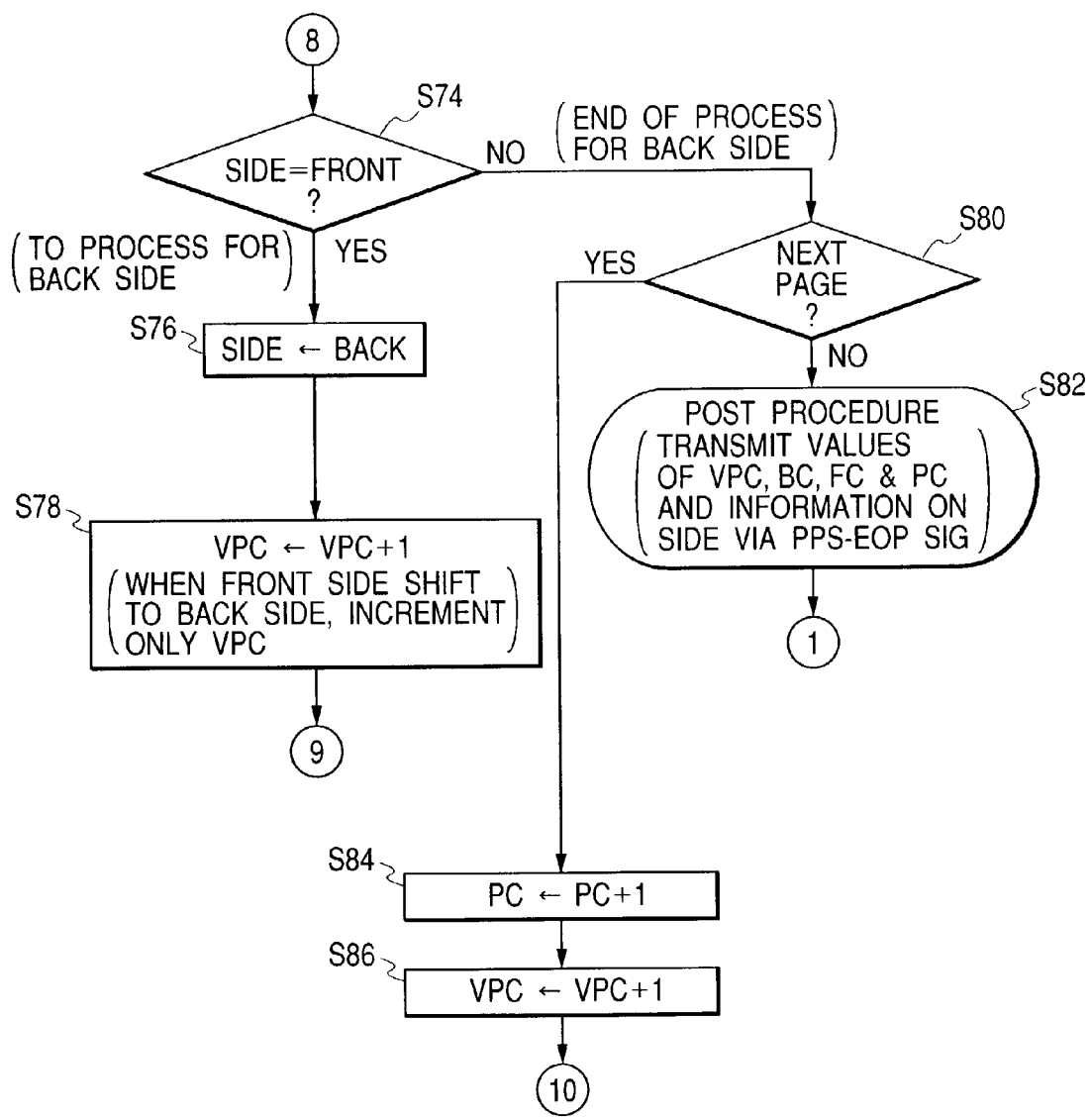
FIG. 6 is a flow chart showing the communication control of the CPU 20 shown in FIG. 1.

In a step S74 of FIG. 6, it is judged whether the side information represents the front side. If the side information represents the front side, the process advances to a step S76, while if the side information represents the back side, the process advances to a step S80.

In the step S76, "back side" is set to the side information.

In a step S78, the value of the virtual page counter is incremented by one (the value of the (real) page counter is not incremented).

If the back side process ends, it is judged in the step S80 whether or not a next page is present. If the next page is present, the process advances to a step S84, while if the next page is not present, the process advances to a step S82.

In the step S82, the facsimile communication post-procedure is executed. In the post-procedure, the virtual page counter (VPC), the block counter (BC) corresponding to the virtual page counter, the number of frames (FC) of the block, the page counter (PC), the side information or the information on side (SIDE) are included in a PPS-EOP signal, and the obtained signal is transmitted.

In the step S84, the value of the page counter is incremented by one, and in a step S86, the value of the virtual page counter is incremented by one (i.e., the values of both the page counter and the virtual page counter are incremented).

Figure 7:
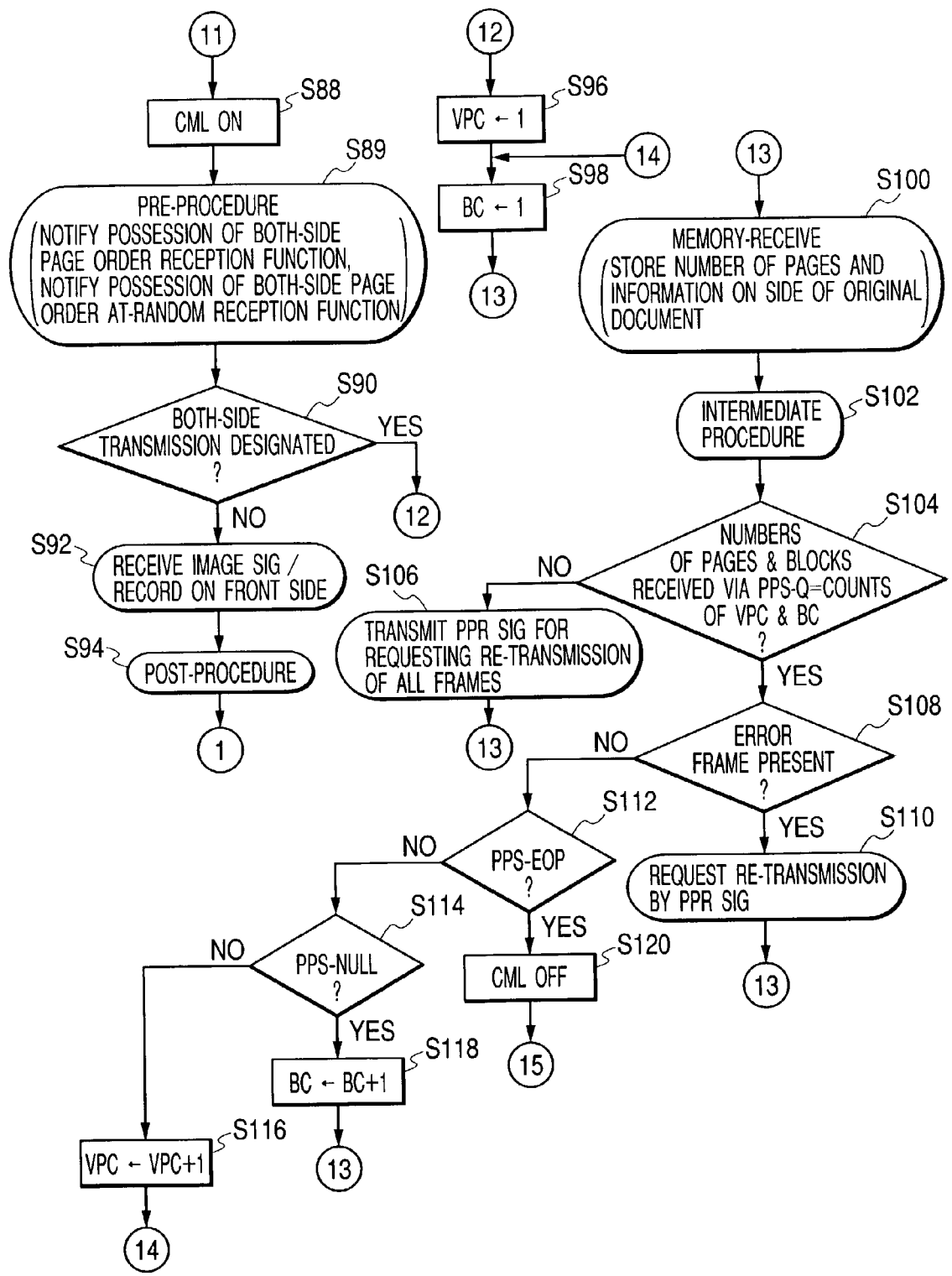
FIG. 7 is a flow chart showing the communication control of the CPU 20 shown in FIG. 1.

On the other hand, in a reception process, in the step S88 of FIG. 7, the CML of the NCU 2 is turned on through the bus 32, whereby the line is connected to the side of the facsimile apparatus.

Then, in a step S89, the facsimile communication pre-procedure is executed. In the facsimile apparatus in question, possession of the both-side page order reception function is notified. Also, possession of a both-side page order at-random reception function is notified.

In a step S90, it is judged whether or not the both-side transmission is designated by the transmitter. If the both-side transmission is designated by the transmitter, the process advances to a step S96, while if the both-side transmission is not designated, the process advances to a step S92.

If the both-side transmission is not designated by the transmitter, the image signal is received and recorded on the front side of the recording paper in the step S92. Then, in a step S94, the facsimile communication post-procedure is executed. In the post-procedure, the received image data is entirely recorded on the front side of the recording paper by the recording circuit 16.

On the other hand, if the both-side transmission is designated by the transmitter, "1" is set to the virtual page counter in the step S96. Moreover, to perform the above reception control with a block as a unit, "1" is set to the block counter in a step S98.

In a step S100, memory reception of the image signal is performed.

Then, in a step S102, the intermediate procedure is executed. In the intermediate procedure, as explained in the step S72, the number of pages of the transmission original document (i.e., the values of the real and virtual page counters), the information on side and the like are notified via the PPS-Q signal in a (next) intermediate procedure protocol, whereby the notified information is related to the image signal received in the step S100, and the information thus obtained is stored in a predetermined area of the memory circuit 18.

In a step S104, it is judged whether or not the virtual page number (VPC) and the block number (BC) received via the PPS-Q signal are respectively coincident with the values counted by the virtual page counter and the block counter on the side of the apparatus in question (receiver). If these values are not coincident with others, it is considered that there were some errors. Thus, the process advances to a step S106, while if these values are coincident with others, the process advances to a step S108.

In the step S106, a PPR signal for requesting re-transmission of all the frames is transmitted, and the process returns to the step S100 to again perform the memory reception.

In the step S104, if the virtual page number (VPC) and the block number (BC) are respectively coincident with the values counted by the virtual page counter and the block counter on the receiver side, then it is judged in the step S108 whether or not an error frame is present in the received image signal. Here, the error frame is checked by collating a CRC given to each frame, or the like. If the error frame is present in the received image signal, the process advances to a step S110 to request the re-transmission by the PPR signal, while if the error frame is not present, the process advances to a step S112.

In the steps S112 and S114, it is checked what kind of signal has been transmitted as the PPS-Q signal in the above step S72. First, in the step S112, it is judged whether or not the PPS-EOP signal (transmitted after the last page as described above) has been received. If the PPS-EOP signal has been received, the process advances to a step S120, while if the PPS-EOP signal is not received, the process advances to the step S114.

In the step S114, it is judged whether or not the PPS-NULL signal has been received. If the PPS-NULL signal has been received, the process advances to a step S118.

When the PPS-NULL signal is received, this means that the end of one block, whereby the value of the block counter is incremented by one in the step S118. On the other hand, if the PPS-NULL signal is not received, the process advances to a step S116, whereby the value of the virtual page counter is incremented by one.

In the step S120, a signal of which the signal level is "0" is output to the signal line 20a to turn off the CML, whereby calling connection is disconnected.

Figure 8:
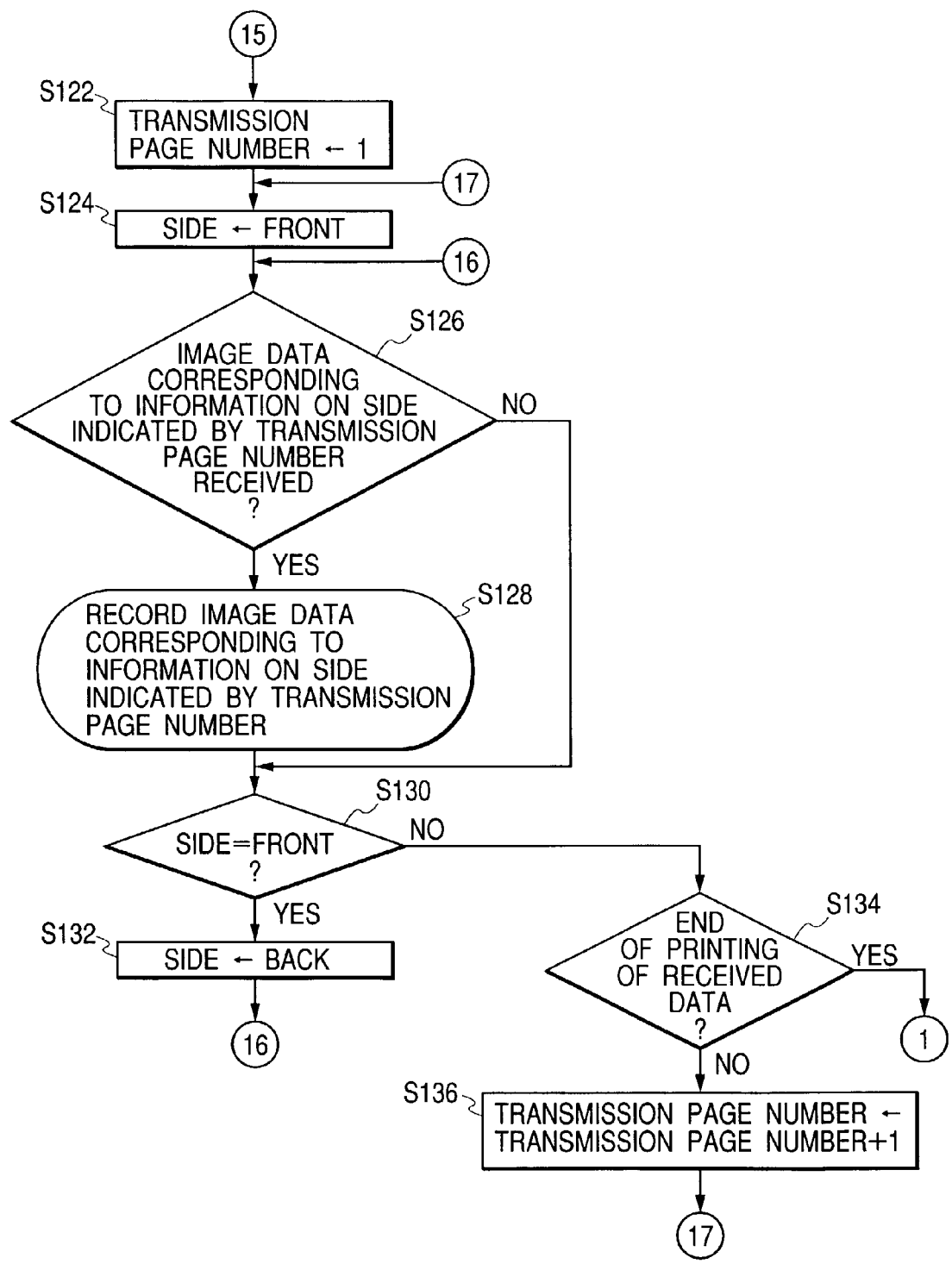
FIG. 8 is a flow chart showing the communication control of the CPU 20 shown in FIG. 1.

After then, the received image is recorded according to the process shown in FIG. 8. First, in a step S122 of FIG. 8, "1" is set to the transmission page number, and, in a step S124, "front side" is set to the information on side (allocated to the register area or the like of the memory circuit 18).

In a step S126, it is judged whether or not the image data corresponding to the information on side indicated by the transmission page number is memory-received. If YES in the step S126, the process advances to a step S128, while if NO in the step S126, the process advances to a step S130.

In the step S128, the image data corresponding to the information on side indicated by the transmission page number is recorded on the corresponding side of the recording paper by the recording circuit 16.

In the step S130, it is judged whether or not the current information on side (the side processed just now) represents the front side. If YES in the step S130, the process advances to a step S132. Then, "back side" is set to the information on side, and the process since the step S126 is repeated. On the other hand, if the current information on side represents the back side, the process advances to a step S134.

In the step S134, it is judged whether or not the recording output of the reception data memory-received ends. If the recording output of the reception data memory-received does not end, the process advances to a step S136. Then, the value of the transmission page number is incremented by one, and the process since the step S124 is repeated. On the other hand, if the recording output of the reception data memory-received ends, the process returns to the step S4.

As described above, according to the present embodiment, in the facsimile apparatus which transmits and receives the image data to be recorded on both the sides of the recording paper, when the page data including the image data of one of either the front or back side of the original document is transmitted or received, the data to be transmitted is added with the attribute data such as, the page counter (page counter PC) representing the number of pages of the real original document, the information (side information (information on side) SIDE) representing whether the front side or the back side of the original document, the virtual page number information (virtual page counter VPC) synchronizing with the transmission order of the page data, the information (block counter BC) representing the block number corresponding to the virtual page number, and the frame number data (the number of frames FC) representing the number of frames constituting each block. Therefore, the page data on the respective sides can be at random transmitted in arbitrary order. Furthermore, in the case where, e.g., the one side is entire-blank, the page data of this side is omitted from being transmitted, whereby communication efficiency can be improved.

For example, if the one side of the original document includes unavailable data such as entire blank or the like, it is possible to omit the data on this side from being transmitted. Moreover, the data can be transmitted in the order of the front side and the back side. Also, the data on all the front sides can be transmitted, and thereafter the data on all the back sides can be transmitted (in this case, it is possible not to transmit the data on an arbitrary unnecessary side) (FIG. 10).

Moreover, it is possible to perform an error check by using the above attribute data, and, if there is an error, to surely transmit and receive the image data in response to the request of re-transmission.

Particularly, in the above control example, only the virtual page number and the block number are synchronous with the order of transmission/reception. Thus, the receiver side can judge whether or not the image data can be correctly received, by collating the virtual page number and the block number respectively with the values of the corresponding counters of this receiver.

Moreover, since the handshaking procedure in the ECM communication is used for the protocol, a new protocol need not be mounted, whereby the above control can be achieved at a low cost.

Incidentally, to simplify the explanation, the above description does not mention a flow chart in such a case as shown in FIG. 10 of transmitting the data on all the front sides and then transmitting the data on all the back sides without alternately transmitting the data on the front side and the image data on the back side for each page. However, such a change of the transmission order of the sides can be achieved, e.g. by providing beforehand a user interface, such as a display, a keyboard or a mouse, by which the user can arbitrarily change the image once stored in the memory with use of. For example, in the case where there are the images once stored in the memory as shown at the left of FIG. 9 and the data on the back side of the page 2 is changed to unavailable data by using the above user interface (i.e., the user does not wish to transmit this data), the virtual page counter and the block counter are set to have the continuous values respectively, and the value of the (real) page counter and the information on side are changed, whereby the reproduction order of the data on the receiver side can be changed to a desirable form. It should be noted that the above example is strictly one example. Therefore, if the attribute data as shown in FIG. 9 is used, it is easy to take out the image on the certain side if necessary and exchange the position and the order of the sides when the image is reproduced.

In the above embodiment, the structure of the facsimile-dedicated apparatus is shown. However, it is needless to say that the present invention is applicable to not only the facsimile-dedicated apparatus but also a communication apparatus which uses an arbitrary communication protocol of other form. For example, the present invention is applicable to a structure that a (FAX) modem, a terminal adapter or the like is mounted to/built in a general-purpose terminal such as a personal computer, and communication is performed according to a predetermined communication protocol under the control of software. In this case, the technique of the present invention can be used to designate, in a relay process, a specific communication mode used in the arbitrary communication protocol. Moreover, the control program of the present invention can be stored in and supplied from not only the above memory circuit 18 but also various computer-readable recording medium such as a hard disk, a floppy disk, an optical disk, a magnetooptical disk, a memory card, and the like.

As apparent from the above, according to the present invention, it is possible to add, to the page data to be transmitted, the attribute data of at least the page counter (PC) representing the number of pages of the real original document, the information (SIDE) representing whether the front side or the back side of the original document, and the virtual page number data (VPC) synchronous with the transmission order of the page data, and then transmit and receive the obtained data. Further, on the receiver side, it is possible to image-record the received page data to both the sides of the recording paper, on the basis of the transmitted attribute data of the page counter (PC) representing the number of pages of the real original document and the information (SIDE) representing whether the front side or the back side of the original document. Therefore, even if the images are transmitted in arbitrary order or even if the page data corresponding to an unnecessary side is omitted from being transmitted, the entire transmission images can be correctly reproduced on the receiver side, the communication time can be shortened, and other process such as the data re-transmission and the like can be performed by using such the attribute data as above, whereby there are significant effects that secure and high-speed both-side transmission can be performed.

What is claimed is:

1. An electronic apparatus which conducts facsimile communication to transmit and receive image data to be recorded respectively on both front and back sides of a recording paper, said apparatus comprising a transmitter and a receiver,
   wherein, when said electronic apparatus transmits and receives page data including the image data of either one of front and back sides of an original document, said transmitter is adapted to:
   (1) add, to the page data to be transmitted, attribute data of at least a page counter (PC) representing the actual number of pages of the original document, information (SIDE) representing whether the page data corresponds to the front side or the back side of the original document, and virtual page number data (VPC) synchronous with a transmission order of the page data, and then transmit the attribute data via a post-message signal according to a recommended facsimile procedure, and
   (2) transmit neither image data nor the post-message signal for a page having no available information, but to add continuous virtual page number data (VPC) and then transmit the post-message signal for pages preceding and succeeding the page having no available information; and
   wherein said receiver is adapted to image-record the received page data onto both of the sides of the recording paper, on the basis of the transmitted attribute data of the page counter (PC) representing the actual number of pages of the original document, the information (SIDE) representing whether the page data corresponds to the front side or the back side of the original document and the virtual page number data (VPC), and to conduct such recording so as to output as a blank sheet the pages having no available information.

2. An electronic apparatus according to claim 1, wherein th page data is transmitted and received with a block as a unit, the block having a predetermined frame structure, and at that time, data (BC) representing a block number corresponding to a virtual page number and frame number data (FC) representing the number of frames constituting each block are included in the attribute data and then transmitted and received.

3. An electronic apparatus according to claim 1, wherein said receiver performs an error check for the page data by using the attribute data received together with the page data, and, if error is detected, requests a re-transmission.

4. An electronic apparatus according to any one of claims 1 to 3, wherein the transmission, the reception and the re-transmission of the page data and the attribute data are performed using an ECM procedure.

5. A control method for an electronic apparatus which conducts facsimile communication to transmit and receive image data to be recorded respectively on both front and back sides of a recording paper, wherein the electronic apparatus transmits and receives page data including the image data of either one of front and back sides of an original document, the method comprising the steps of:
   a transmitter of the electronic apparatus adding, to the page data to be transmitted, attribute data of at least a page counter (PC) representing the actual number of pages of the original document, information (SIDE) representing whether the page data corresponds to the front side or the back side of the original document, and virtual page number data (VPC) synchronous with a transmission order of the page data, and then transmitting the attribute data via a post-message signal according to a recommended facsimile procedure;
   the transmitter transmitting neither image data nor the post-message signal for a page having no available information, but adding continuous virtual page number data (VPC) and then transmitting the post-message signal for pages preceding and succeeding the page having no available information; and
   a receiver image-recording the received page data onto both of the sides of the recording paper, on the basis of the transmitted attribute data of the page counter (PC) representing the actual number of pages of the original document, the information (SIDE) representing whether the page data corresponds to the front side or the back side of the original document and the virtual page number data (VPC), and conducting such recording so as to output as a blank sheet the pages having no available information.

6. A control method according to claim 5, wherein the page data is transmitted and received with a block as a unit, the block having a predetermined frame structure, and at that time, data (BC) representing a block number corresponding to a virtual page number and frame number data (FC) representing the number of frames constituting each block are included in the attribute data and then transmitted and received.

7. A control method according to claim 5, wherein the receiver performs an error check for the page data by using the attribute data received together with the page data, and, if an error is detected, requests a re-transmission from the transmitter.

8. A control method according to any one of claims 5 to 7, wherein the transmission, the reception and the re-transmission of the page data and the attribute data are performed using an ECM procedure.

9. A computer-readable storage medium which stores a control program for an electronic apparatus which comprises a receiver and a transmitter and which conducts facsimile communication to transmit and receive image data to be recorded respectively on both front and back sides of a recording paper, wherein the electronic apparatus transmits and receives page data including the image data of either one of front and back sides of an original document, and code of said control program comprises code for causing the apparatus to executed the steps of:

adding, to the page data to be transmitted, attribute data of at least a page counter (PC) representing the actual number of pages of the original document, information (SIDE) representing whether the page data corresponds to the front side or the back side of the original document, and virtual page number data (VPC) synchronous with a transmission order of the page data, and then transmitting the attribute data via a post-message signal according to a recommended facsimile procedure;

transmitting neither image data nor the post-message signal for a page having no available information, but adding continuous virtual page number data (VPC) and then transmitting the post-message signal for pages preceding and succeeding the page having no available information; and image-recording the received page data to both of the sides of the recording paper, on the basis of the transmitted attribute data of the page counter (PC) representing the actual number of pages of the original document, the information (SIDE) representing whether the page data corresponds to the front side or the back side of the original document and the virtual page number data (VPC), and conducting such recording so as to output as a blank sheet the pages having no available information.

10. A computer-readable storage medium according to claim 9, wherein the program causes the page data to be transmitted and received with a block as a unit, the block having a predetermined frame structure, and at that time, data (BC) representing a block number corresponding to a virtual page number and frame number data (FC) representing the number of frames constituting each block being included in the attribute data and then being transmitted and received.

11. A computer-readable storage medium according to claim 9, wherein the receiver performs an error check for the page data by using the attribute data received together with the page data, and, if an error is detected, requests a re-transmission.

12. A computer-readable storage medium according to any one of claims 9 to 11, wherein the transmission, the reception and the re-transmission of the page data and the attribute data are performed using an ECM procedure.

13. A control program stored in a computer-readable storage medium for an electronic apparatus which has a transmitter and a receiver and which conducts facsimile communication to transmit and receive image data to be recorded respectively on both front and back sides of a recording paper, wherein the electronic apparatus transmits and receives page data including the image data of either one of front and back sides of an original document, and code of said control program comprises code for causing the apparatus to execute the steps of:

adding, to the page data to be transmitted, attribute data of at least a page counter (PC) representing the actual number of pages of the original document, information (SIDE) representing whether the page data corresponds to the front side or the back side of the original document, and virtual page number data (VPC) synchronous with a transmission order of the page data, and then transmitting the attribute data via a post-message signal according to a recommended facsimile procedure;

transmitting neither image data nor the post-message signal for a page having no available information, but adding continuous virtual page number data (VPC) and then transmitting the post-message signal for pages preceding and succeeding the page having no available information; and image-readable the received page data onto both of the sides of the recording paper, on the bases of the transmitted attribute data of the page counter (PC) representing the actual number of pages of the original document, the information (SIDE) representing whether the page data corresponds to the front side or the back side of the original document and the virtual page number data (VPC), and conducting such recording so as to output as a blank sheet the pages having no available information.

14. A control program according to claim 13, wherein the page data is transmitted and received with block as a unit, having a predetermined frame structure, and at that time, data (BC) representing a block number corresponding to a virtual page number and frame number data (FC) representing the number of frames constituting each clock are included in the attribute data and then transmitted and received.

15. A control program according to claim 13, wherein the receiver performs an error check for the page data by using the attribute data received together with the page data, and, if an error is detected, requests a re-transmission.

16. A control program according to any one of claims 13 to 15, wherein the transmission, the reception and the re-transmission of the page data and the attribute data are performed using an ECM procedure.

* * * * *

UNITED STATES PATENT AND TRADEMARK OFFICE
CERTIFICATE OF CORRECTION

| | |
|---|---|
| PATENT NO. | : 6,982,806 B2 |
| APPLICATION NO. | : 10/193199 |
| DATED | : January 3, 2006 |
| INVENTOR(S) | : Takehiro Yoshida |

It is certified that error appears in the above-identified patent and that said Letters Patent is hereby corrected as shown below:

ON Title PAGE AT (63) RELATED U.S. PATENT APPLICATION DATA

"Oct. 1, 2001." should read --Jan. 10, 2001.--.

ON Title PAGE AT (57) ABSTRACT

Line 7, "took" should read --taken--.

COLUMN 1

Line 8, "Oct. 1, 2001," should read --Jan. 10, 2001,--.

COLUMN 2

Line 2, "took" should read --taken--.

COLUMN 12

Line 54, "other" should read --another--.

COLUMN 16

Line 24, "image-readable" should read --image-recording--.

Signed and Sealed this

Twenty-second Day of August, 2006

JON W. DUDAS
*Director of the United States Patent and Trademark Office*